INVENTORS
D. L. CRAIN
R. E. REUSSER
BY
ATTORNEYS

United States Patent Office 3,590,094
Patented June 29, 1971

3,590,094
CONVERSION OF LINEAR ACYCLIC OLEFIN TO BRANCHED CHAIN OLEFIN
Robert E. Reusser and Donald L. Crain, Bartlesville, Okla., assignors to Phillips Petroleum Company
Filed Apr. 18, 1968, Ser. No. 722,259
Int. Cl. C07c 3/62
U.S. Cl. 260—683            10 Claims

ABSTRACT OF THE DISCLOSURE

A linear acrylic olefin hydrocarbon is converted to produce an acrylic olefin hydrocarbon product by a combination of steps comprising dimerization followed by the olefin reaction with recycle of both heavier and lighter olefins to the olefin reaction zone.

---

Figure 1:
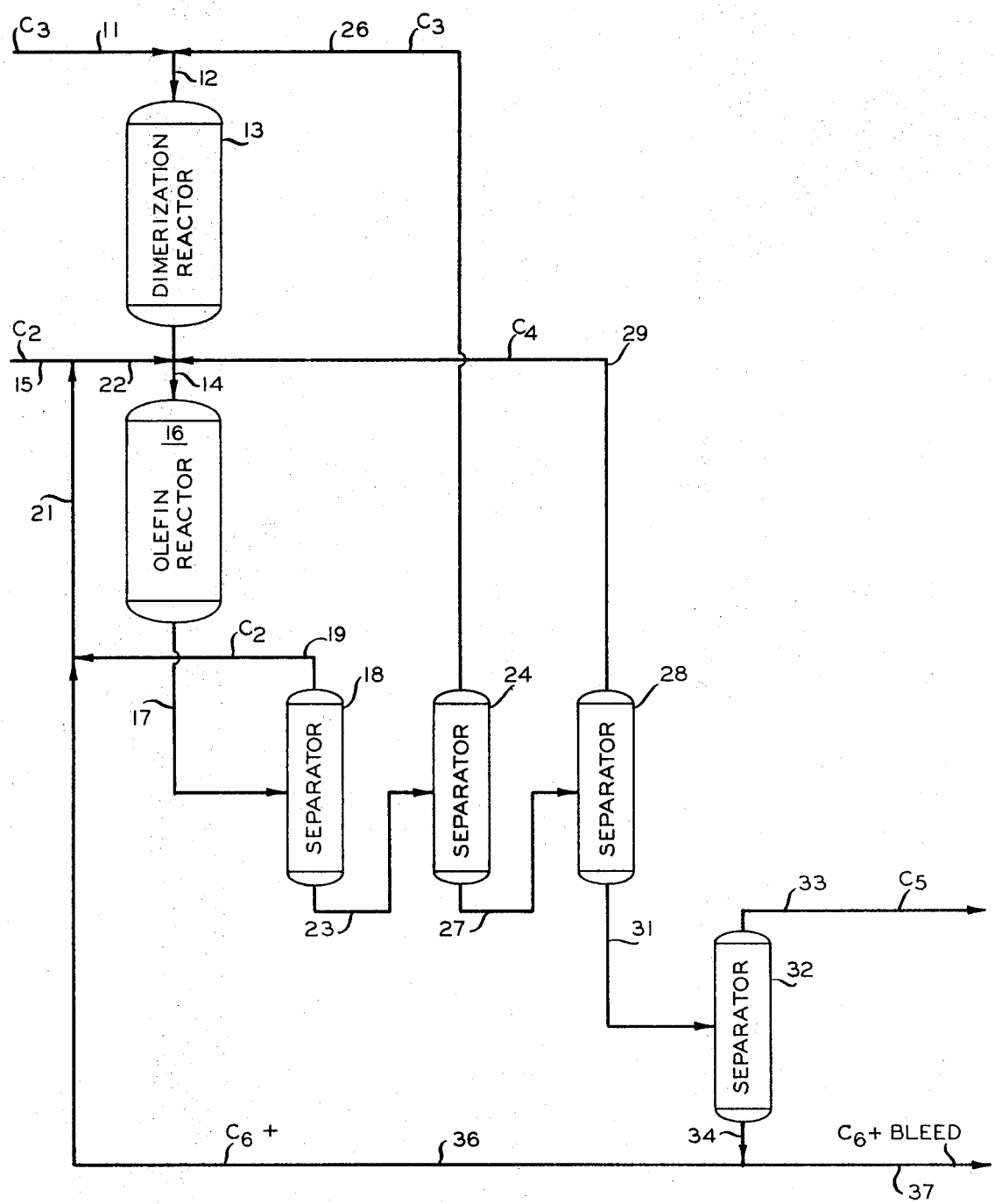

This invention relates to producing a branched acrylic olefin hydrocarbon from a linear acrylic olefin hydrocarbon. In one aspect the invention relates to a process for producing isoamylene from propylene.

In many instances it is desirable to convert a linear acrylic olefin hydrocarbon to produce a branched acrylic olefin hydrocarbon. For example, isoamylene, which is a valuable intermediate for the production of isoprene, is a desirable product to produce from a relatively inexpensive and readily available feed stock such as propylene.

An object of this invention is to produce a branched aliphatic olefine hydrocarbon by conversion of a linear aliphatic olefin hydrocarbon. Another object of the invention is to produce isoamylene from propylene. Other aspects, objects and the advantages of the invention are apparent in the written description, the drawing, and the claims.

According to the invention, a linear acrylic olefin hydrocarbon is converted to produce a branched acrylic olefin hydrocarbon by a two-step catalytic conversion process comprising dimerization and the olefin reaction with recycle to the olefin reaction zone of materials lighter and heavier than the desired product olefin. Further according to the invention, isoamylene is produced from propylene by dimerizing the propylene followed by an olefin reaction of the propylene dimer in the presence of ethylene to produce isoamylene with recycle to the olefin reaction zone of ethylene and $C_6$ and heavier hydrocarbons.

In the first step, the feed olefin is dimerized over an olefin dimerization catalyst. Catalysts which are suitable can be selected from those known to have a catalytic effect for olefin dimerization, including, for example, silica, silica-alumina, acidized silica or silica-alumina, organic halide-treated silica or silica-alumina, supported phosphoric acid, or $P_2O_5$, molybdic oxide, tungstic oxide, nickel oxide on silica or silica-alumina, etc.

The feed olefin can be diluted. For example, when the feed is propylene, it can be diluted with paraffinic or cycloparaffinic diluents having up to about 12 carbon atoms per molecule. Conditions generally are chosen such that at least about 25 percent of the propylene is converted in this first stage of the process. The dimerization is generally carried out continuously through the use of a fixed bed or fluidized bed catalyst system and the entire effluent from the first step can be conducted for subsequent conversion in the second step of the process. When ethylene is present in the feed stream, it is frequently desirable to use a catalyst and conditions which promote dimerization of propylene with less conversion of ethylene. Examples of catalysts suitable for such operation include $P_2O_5$ or phosphoric acid on kieselguhr.

In the second step, a stream from the dimerization step is contacted with an olefin reaction catalyst under conditions suitable to produce a product of the olefin reaction.

The term "olefin reaction" as used herein is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third between said second and fourth carbon atoms. Said first and second carbon atoms and said third and fourth carbon atoms can be in the same or in different molecules.

The olefin reaction as used in the present invention is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms with a different acyclic mono- or polyene having 3 or more carbon atoms to produce different acyclic olefins; for example, the conversion of propylene and isobutylene yields ethylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium or tellurium or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible on an oxide by calcination of molybdenum, tungsten or rhenium or by magnesium tungstate or beryllium phosphotungstate.

(4) Silica, alumina, aluminum phosphate, zirconium phosphate, calcium phosphate, magnesium phosphate, or titanium phosphate promoted by a hexacarbonyl of molybdenum or tungsten; and (5) Homogeneous olefin reaction catalysts can be used where appropriate. In such embodiments, catalyst removal and/or recovery steps normally are required. For example, transition metal containing homogeneous catalyst systems, active for the disproportionation of olefins, can be used. An example of one such catalyst system is bis(triphenylphosphine)dinitrosyldichloromolybdenum and methylaluminum sesquichloride can be used at atmospheric pressure, room temperature and preferably in the presence of a reaction diluent. Some suitable homogeneous catalyst systems are disclosed and claimed in U.S. Ser. Nos. 635,649 (now abandoned), 635,657 (now abandoned), 635,669 (now abandoned),635,693 (now abandoned), 635,708, filed May 3, 1967; 694,872 (now abandoned), 694,873 (now abanodned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium or tellurium compound by conventional method such as for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and berylliuim phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant, such as, for example, an organoaluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 60° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system, the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

Depending upon the specific feed materials and the specific catalysts being used, any conventional contacting technique can be utilized, such as fixed bed reaction, fluidized bed reaction, liquid phase batch reaction, and the like.

At the completion of the reaction, the reaction mixture can be processed to recover any desired product by any conventional means such as fractionation, crystallization, adsorption, and the like. Unreacted material or products not in the desired molecular weight range can be recycled.

After the hydrocarbon stream leaves the reaction zone of the second catalytic stage, any suitable method can be used to separate the hydrocarbon phase from the catalyst phase and to recover the products. Techniques such as fractionation, solvent extraction, adsorption, and the like, may be employed for the separation of products. Ethylene and any other olefin lighter than the product olefin, as well as olefins heavier than the product olefin, can be recycled to the olefin reaction section. Unconverted feed material can be recycled to the dimerization reactor. Where the feed is propylene and the product is isoamylene, ethylene and $C_6$ and heavier hydrocarbons are recycled to the olefin reaction zone and propylene is recycled to the dimerization reactor.

Figure 2:
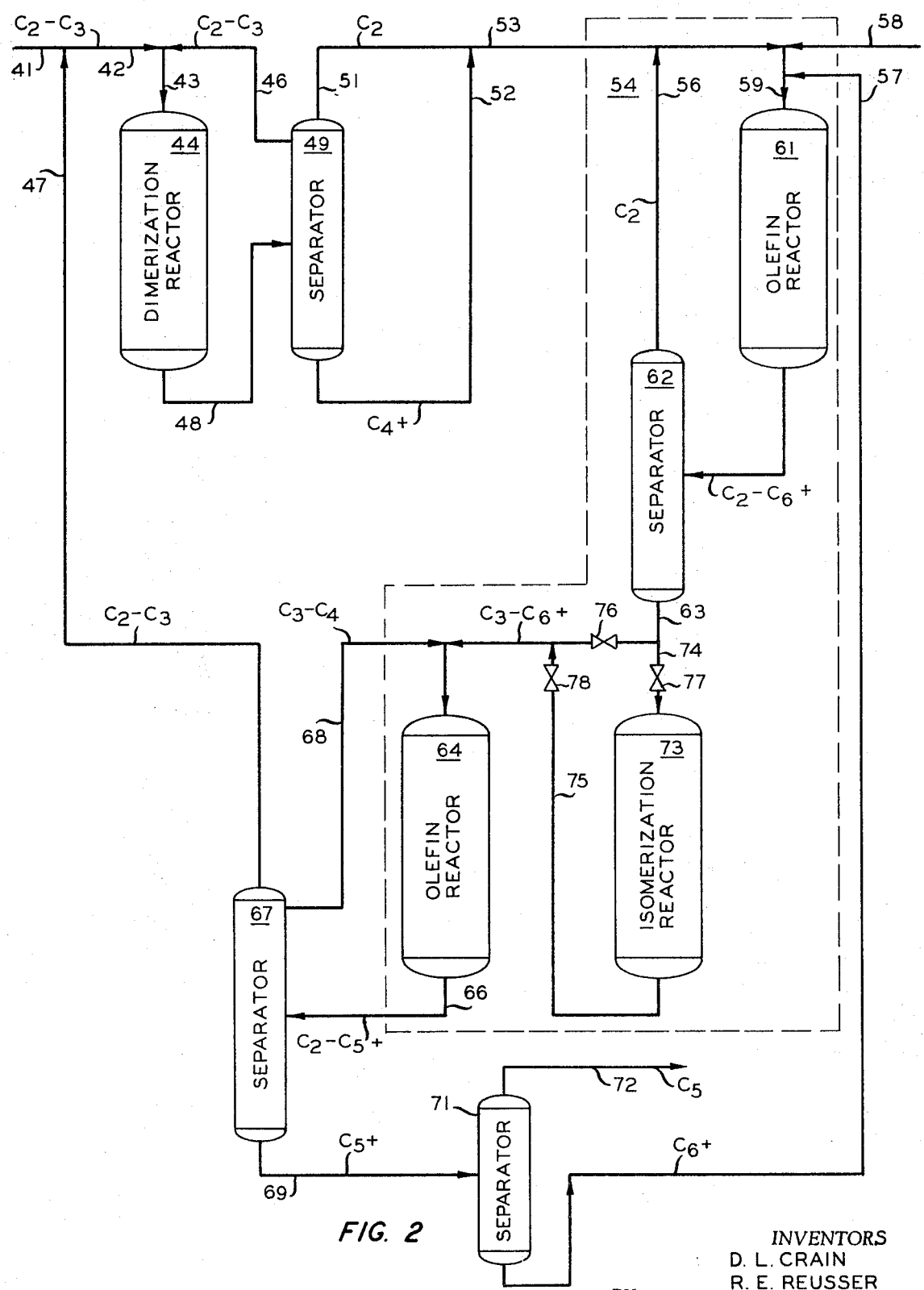
Figure 3:
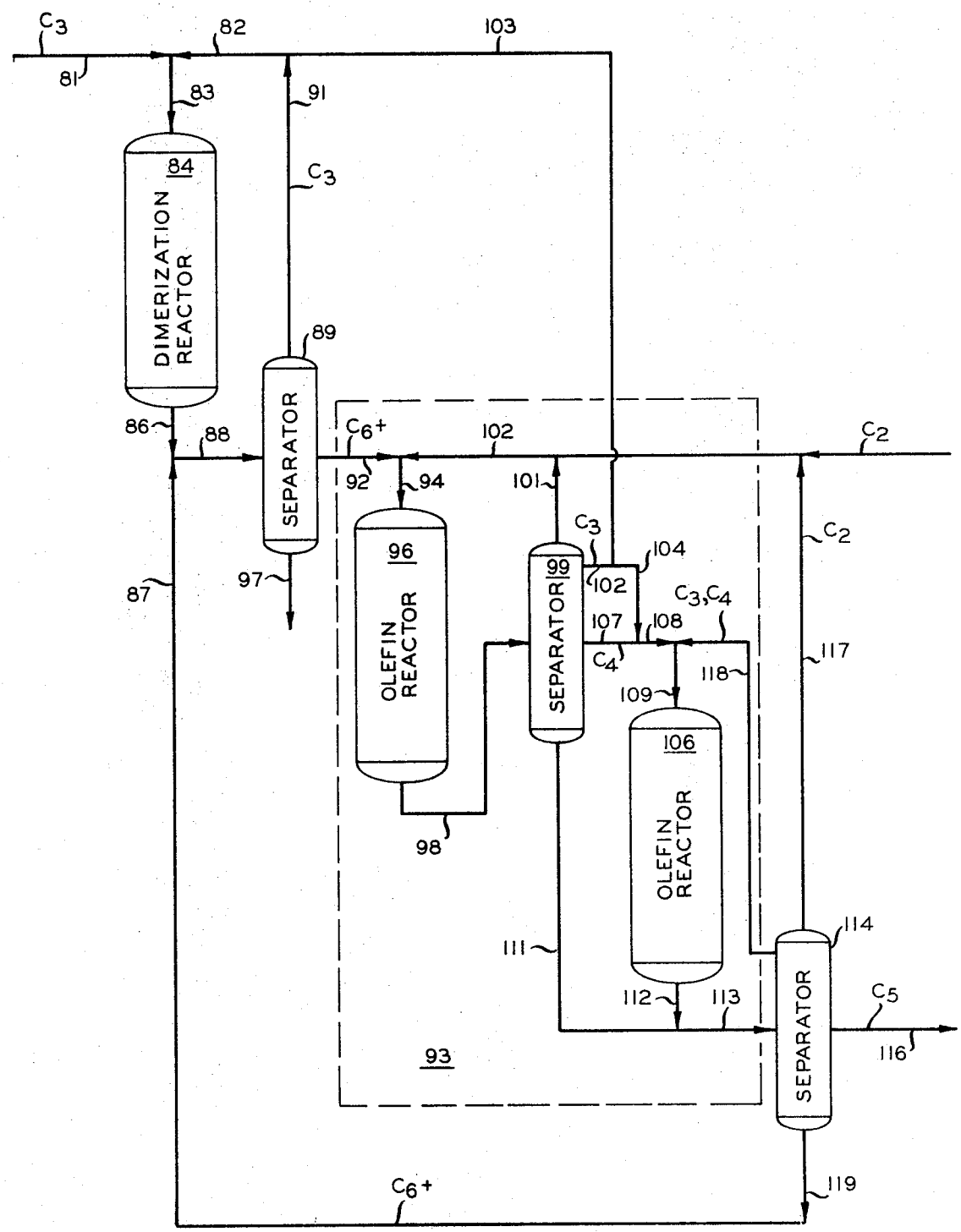

In the drawing, FIG. 1 illustrates the operation of the invention wherein the entire effluent from the dimerization reactor is passed into the olefin reactor. FIG. 2 and FIG. 3 illustrate embodiments of the invention in which a separator is interposed between the dimerization reactor and the olefin reactor and an additional olefin reactor is utilized.

In the practice of the invention as illustrated in FIG. 1, a propylene feed stock, together with recycle propylene which is generated in later catalytic stages, is contacted continuously with a dimerization catalyst to produce branched hexenes. Additional smaller amounts of higher molecular weight oligomers of propylene may also be formed.

The entire effluent from the dimerization step is then blended with ethylene, some recycled ethylene, some recycled propylene dimers and other oligomers, as well as with some recycled mixed iso- and n-butenes. The resulting blend of olefins is then passed into the olefin reactor which contains a mixture of an olefin disproportionation catalyst and a double bond olefin isomerization catalyst, for example, a mixed bed containing silica-supported tungsten oxide intimately blended with magnesium oxide. The above-named catalysts are presently preferred, although any compatible mixture of an olefin isomerization catalyst and an olefin disproportionation catalyst can be used. The feed stream to the catalytic unit contains ethylene in proportions which may range from about 1 to about 20, preferably 4 to about 10 mols of ethylene per mol of propylene oligomers. The ethylene can be a blend of feed ethylene as well as some recycle ethylene obtained from later separation steps. If desired, the ethylene stream can be replaced with a propylene stream or a mixed ethylene-propylene stream. The effluent from the disproportionation-isomerization step contains a substantial quantity of isoamylenes which are separated in subsequent separation stages and recovered as product.

olefin reactor 16. The effluent from reactor 16 is passed through pipe 17 into separator 18. The overhead from separator 18 is passed through pipe 19 and pipe 21 to pipe 22 for recycle to reactor 16. The kettle product from separator 18 is passed through pipe 23 into separator 24. The overhead from separator 24 is returned to reactor 13 through pipe 26. The kettle product from separator 24 is passed through pipe 27 to separator 28. The overhead from separator 28 is returned through pipe 29 to olefin reactor 16 while the kettle product is passed through pipe 31 to separator 32. The overhead from separator 32, comprising isoamylene, is recovered as a product stream from pipe 33. The kettle product from separator 32 is passed through pipe 34 and the major portion thereof returned to reactor 16 through pipe 36, and pipes 21, 22 and 14. A small amount can be bled off through pipe 37 to avoid the build-up of undesired materials.

In an example according to FIG. 1, the dimerization zone and the first olefin reaction zone are contained in a single vessel. The dimerization catalyst is tungsten oxide and the reaction is carried out at 400 p.s.i.g., 550° F. and a weight hourly space velocity (WHSV) of 2. By weight hourly space velocity is meant the weight of feed stream per unit of weight of catalyst per hour.

The olefin reaction catalyst is an intimate physical mixture of a magnesium oxide catalyst, plus a tungsten oxide on silica catalyst, containing about 8 weight percent tungsten oxide. The pressure is 400 p.s.i.g., the temperature is 700° F., and the weight hourly space velocity is 30. The composition of the various streams is given in the table below, in which the numbers of the columns correspond with the numbers of the pipes in FIG. 1.

TABLE

| Parts by weight | 11 | 15 | 17 | 19 | 23 | 26 | 27 | 29 | 31 | 33 | 36 | 21 | 22 | 37 | 12 |
|---|---|---|---|---|---|---|---|---|---|---|---|---|---|---|---|
| $C_2=$ |  | .3330 | 4.0957 | 4.0957 |  |  |  |  |  |  |  | 4.0957 | 4.4287 |  | 72 |
| $C_3=$ | .7444 |  | 8.4228 |  | 8.4228 | 8.4228 |  |  |  |  |  |  |  |  | 9 |
| $n\text{-}C_4=$ |  |  | .5057 |  | .5057 |  | .5057 | .5057 |  |  |  |  |  |  | 16 |
| $i\text{-}C_4=$ |  |  | 7.2000 |  | 7.2000 |  | 7.2000 | 7.2000 |  |  |  |  |  |  |  |
| $n\text{-}C_5=$ |  |  | .0714 |  | .0714 |  | .0714 |  | .0714 | .0714 |  |  |  |  |  |
| $i\text{-}C_5=$ |  |  | 1.0000 |  | 1.0000 |  | 1.0000 |  | 1.0000 | 1.0000 |  |  |  |  |  |
| $C_6+$ |  |  | 4.2917 |  | 4.2917 |  | 4.1917 | 4.2947 |  |  | 4.2957 | 4.2957 | 4.2957 | .0060 |  |
| Total | .7444 | .3330 | 25.5873 | 4.0957 | 21.4916 | 8.4228 | 13.0688 | 7.757 | 5.3561 | 1.0714 | 4.2957 | 8.3814 | 8.7144 | .0060 | 9.1672 |

As illustrated in FIG. 1, the propylene dimerization step and the olefin reaction step, involving the disproportionation-isomerization catalyst combination, are carried out in two separate reactor vessels. However, these steps can also be carried out in two separate zones within the same vessel. The latter mode of operation is particularly applicable when all the catalysts or catalyst components involved are of the same general type, such as, for example, inorganic oxides, which can be both activated and regenerated in the same general manner.

Although the exact nature of the various reactions which can occur cannot be delineated precisely, it is believed that the isoamylene product obtained in the olefin reaction unit is the result of the reaction of isobutene with either propylene or 2-butene. It is believed that the isobutene is generated in situ within the unit, for example, by a reaction of ethylene and/or propylene with branched olefins such as isohexene. Thus, isoamylenes are produced using the process of the present invention by combining several catalytic reactions within one catalytic reactor.

The exact operating conditions for each of the catalytic reactions depends upon the specific catalyst utilized as well as other considerations of preceding and subsequent processing, as well as the composition of the feed. It is preferred that the dimerization and the olefin reaction steps be carried out at similar conditions where appropriate.

In the operation of FIG. 1, propylene is fed through pipe 11 and pipe 12 into dimerization reactor 13. The effluent from reactor 13 is passed through pipe 14 into In the practice of the invention as illustrated in FIG. 2, an ethylene-propylene stream is contacted with a catalyst which dimerizes the propylene to isohexenes and heavier branched olefins. As illustrated, the effluent from the dimerization reaction is separated to permit immediate recycle of propylene. However, the entire effluent of the dimerization reactor can be passed to the olefin reactor if desired.

The ethylene:propylene ratio of the feed stream can vary over broad ranges. If desired, a supplemental ethylene stream can be used to balance the ethylene consumption.

The two olefin reactors and an intermediate separator, together with the isomerization reactor, if employed, comprise the olefin reaction zone. The effluent from the dimerization unit, as illustrated in FIG. 2, is separated to give an ethylene concentrate, an ethylene-propylene mixture for recycle to the dimerization unit, and a butenes and heavier principally propylene oligomers, stream. The butenes and heavier stream is then conducted to a catalytic unit which contains a mixture of an olefin disproportionation catalyst and an olefin double bond isomerization catalyst such as mixed bed containing silica-supported tungsten oxide intimately mixed with magnesium oxide. Before contact with a mixed bed catalyst, the propylene oligomer-containing stream is blended with the ethylene concentrate stream in proportions which can range from about 1 to about 20, preferably 4 to 10, mols of ethylene per mole of propylene oligomers. The ethylene stream can be a blend of the ethylene concentrate obtained from the first catalytic unit with recycle ethylene obtained from subsequent separation stages and, if necessary, with suitable amounts of supplemental makeup ethylene. The effluent from this unit contains substantial amounts of n-butenes, isobutene, propylene, some amylenes, as well as unconverted reactants.

The ethylene is removed from the effluent of this reactor and recycled. The remaining $C_3$ to $C_6+$ olefins are then subjected to a reaction in a third catalytic unit containing an olefin disproportionation catalyst such as tungsten oxide supported on silica. If desired, prior to feeding into the third catalytic unit, the stream can be subjected to a double bond isomerization. The effluent from the third catalytic unit contains a substantial amount of isoamylenes which are recovered in subsequent separation stages. Other components of the effluent including ethylene, propylene, butenes, isohexenes, and heavier olefins, are recycled as shown. The bulk of the isoamylene product is produced by the reactions taking place in the third catalytic unit in which isobutene, for example, is reacted with propylene and/or or 2-butene over the silica-supported tungsten oxide disproportionation catalyst.

A particular advantage of this sequence of steps is that a combined ethylene-propylene stream, which streams frequently are available as by-product streams from other olefin processes and available at low cost, can be used. Such a stream, for example, is available in a process in which propylene and $C_4$ olefins are produced by the treatment of cat cracked or cat poly gasoline with excess ethylene over a disproportionation catalyst.

Referring to the drawing, a combined ethylene-propylene stream is fed through pipe 41, pipe 42 and pipe 43 into dimerization reactor 44, along with recycle from pipes 46 and 47. The effluent stream, comprising propylene dimer, is fed through pipe 48 to separator 49. The overhead from separator 49, comprising the major portion of the ethylene, is removed through pipe 51 and combined with the bottoms product comprising $C_4+$ olefins which are removed from separator 49 through pipe 52. A propylene stream is recycled through pipe 46 and this stream can also contain some ethylene, that is, it is not necessary to make a clean separation between ethylene and propylene for this recycle stream.

The combination of streams from pipes 51 and 52 is fed through pipe 53 into olefin reaction zone 54. This stream is combined with recycle from pipe 56 and pipe 57, together with any additional make-up ethylene which may be fed through pipe 58 and fed through pipe 59 into first olefin reactor 61. The effluent from reactor 61, comprising $C_2$ through $C_6+$ and heavier olefins, is passed into separator 62. Ethylene is removed overhead through pipe 56 and the remainder of the stream, i.e., $C_3$ and heavier olefins, passed through pipe 63 for feeding to reactor 64. The effluent from reactor 64, comprising $C_2$ through $C_5$ and some higher olefins, and containing a substantial quantity of isoamylenes, is passed through pipe 66 to separator 67. An overhead stream, comprising $C_2$ and $C_3$ olefins, is passed through pipe 47 for return to reactor 44. $C_4$ olefins and some propylene are returned to the reactor 64 through pipe 68. $C_5$ and heavier olefins are removed through pipe 69 and fed to separator 71. The overhead product, comprising the $C_5$ fraction including product isoamylenes is removed through pipe 72 while the heavier products are removed through pipe 57 for return to reactor 61. When it is desired to pass all or part of the feed to reactor 64 through reactor 73, valve 76 is closed, or partially closed, and valves 77 and 78 open to permit flow of feed into reactor 73 through pipe 74 and the effluent from reactor 73 through pipe 75.

As illustrated in the drawing, the system comprises dimerization reactor 44, olefin reactor 61, olefin reactor 64, and isomerization reactor 73, together with separators and connecting pipes.

In an example according to FIG. 2, reactor 73 is not used. The catalyst in reactor 44 comprises $P_2O_5$ supported on kieselguhr and this reactor is operated at 400 p.s.i.g. at 550° F. and a weight hourly space velocity of 10. In olefin reactors 61 and 64, the catalyst comprises magnesium oxide and tungsten oxide supported on silica, the pressure is 400 p.s.i.g., the temperature is 700° F. and the weight hourly space velocity is 50.

In the practice of the invention as illustrated in FIG. 3, unreacted propylene from the dimerization step is separated and recycled to the dimerization unit. Heavier olefins including branched propylene dimers and higher oligomers from the dimerization unit are then conducted to an olefin reaction unit which contains a mixture of an olefin disproportionation catalyst and a double bond isomerization catalyst such as a mixed bed containing silica-supported tungsten oxide, intimately mixed with magnesium oxide. Prior to contact with the catalyst in the olefin reaction zone, the dimer containing stream is blended with ethylene in proportions which may range from about 1 to about 20, preferably 4 to about 10, moles of ethylene per mole of oligomerized olefin. The ethylene can be a blend of fresh ethylene feed and/or recycle ethylene, including unreacted ethylene or ethylene generated in later catalytic stages. If desired, a mixture of ethylene and propylene can be used. The effluent from this first olefin reactor contains propylene, isobutene, some isoamylenes and unconverted reactants. The isobutene and propylene from this first reactor are combined in approximately equimolar quantities, and conducted to a second olefin reactor which contains a silica-supported tungsten oxide olefin disproportionation catalyst or any other catalyst which shows activity for olefin disproportionation. The effluent from this second olefin reactor contains a substantial amount of isoamylenes which is recovered in a subsequent separation stage. Other components of the effluent are recycled, propylene to the dimerization unit and ethylene or a mixture of ethylene and propylene together with $C_6$ and heavier olefins are recycled to the first olefin reactor. $C_4$'s and some propylene can be recycled to the second olefin reactor.

The bulk of the isoamylene product is produced by the reaction of propylene and isobutene over the disproportionation catalyst in a second olefin reactor. No significant by-products are formed. As illustrated in the drawing, the system comprises dimerization reactor 84, olefin reactor 93 and olefin reactor 96, together with separators and connecting pipes.

In an example according to FIG. 3, the catalyst in reactor 84 is tungstne oxide, the pressure is 400 p.s.i.g., the temperature is 550° F. and the weight hourly space velocity is 2. In reactor 96, the catalyst comprises magnesium oxide and tungsten oxide on silica, the pressure is 400 p.s.i.g., the temperature is 700° F. and the weight hourly space velocity is 50. In reactor 106, the catalyst comprises tungsten oxide on silica, the pressure is 300 p.s.i.g., the temperature is 800° F., and the weight hourly space velocity is 50.

Propylene is fed through pipe 81 and combined with recycle propylene in pipe 82 for feed through pipe 83 into reactor 84. The effluent from reactor 84 is removed through pipe 86, combined with recycle in pipe 87, and fed through pipe 88 into separator 89. The overhead from separator 89, comprising propylene, is removed through pipe 91 and fed through pipes 82 and 83 into reactor 84. $C_6$ and heavier hydrocarbons are fed through pipe 92 into olefin reaction zone 93, entering through pipe 94 into olefin reactor 96. If desired, a bleed of heavier hydrocarbons can be removed through pipe 97. The effluent from olefin reactor 96 is passed through pipe 98 to separator 99. The overhead from separator 99, comprising ethylene, is fed through pipe 101 to pipe 102 for combination with the stream being fed through pipe 92 into reactor 96. A stream comprising propylene is removed through pipe 102 and fed through pipe 103 back to reactor 84 and/or through pipe 104 for combination with $C_4$'s for feeding to reactor 106. $C_4$ is removed from separator 99 through pipe 107 and fed through pipes 108 and 109 into reactor 106. The bottoms product from separator 99 is removed through pipe 111 and combined with the effluent from olefin reactor 106 in pipe 112 to flow through pipe 113 to separator 114. The product $C_5$ stream is removed through pipe 116. Ethylene is removed overhead and fed through pipe 117 for combination with the overhead from separator 99 to return to reactor 96. $C_3$ and $C_4$ hydrocarbons are removed through pipe 118 for return to reactor 106. $C_6$ and heavier olefins are removed through pipe 119 for recycle to olefin reaction zone 96 via separator 89.

In the practice of the invention, although there are no significant by-products, a small amount of paraffinic materials can be formed and these can be removed at any convenient point in the process, together with any paraffinic materials included in the feed stock. It is also sometimes advantageous to feed to the olefin reaction zones feed streams which have been deoiled, that is, which have had any materials heavier than the feed removed, for example, by distillation. In this way, the accumulation or carry-over of small amounts of materials which may poison or shorten the life of the catalyst is avoided.

The illustration of the invention in the drawing and the description in the specification are, of course, simplified. Many elements required in commercial operations have been eliminated, including, for example, valves controls, etc. Any suitable separation apparatus, including larger or smaller numbers of separation vessels, different types of separation, etc., can be included within the separation zones.

When utilized for the production of amylenes, the product of the process is a mixture of amylene isomers containing a high proportion of isoamylenes. Such a mixture is suitable for dehydrogenation to isoprene.

That which is claimed is:

1. A process for converting propylene to produce isoamylene, comprising the steps of:

feeding said propylene into a dimerization zone and producing in said dimerization zone a branched acyclic dimer of said propylene;

feeding said branched acyclic dimer produced in said dimerization zone into an olefin reaction zone and reacting said dimer with ethylene in said olefin reaction zone according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, to produce isobutene and isoamylene;

separating the effluent from said olefin reaction zone to product a first separated stream comprising ethylene and a second separated stream comprising said isobutene;

recycling said first separated stream to said olefin reaction zone together with at least one olefin having at least six carbon atoms per molecule produced in the process; and feeding said second separated stream to a second olefin reaction zone and reacting said isobutene according to the olefin reaction to produce additional isoamylenes.

2. The process of claim 1 wherein said propylene from said first olefin reaction zone is recycled to said dimerization zone.

3. The process of claim 1 wherein the effluent of said dimerization zone is separated and unreacted starting material recycled to said dimerization zone prior to feeding the effluent to said olefin reaction zone.

4. The process of claim 1 wherein ethylene and propylene are included in the feed to said dimerization zone and conditions are maintained in said zone to produce a dimer of propylene with substantially no reaction of the ethylene.

5. The process of claim 4 wherein the catalyst in said dimerization zone is phosphoric acid on kieselguhr.

6. The process of claim 1 wherein:

said branched acyclic dimer is fed into a first olefin reaction zone and reacted therein according to the olefin reaction with ethylene to produce isobutene and isoamylene;

the effluent from said first olefin reaction zone is separated to provide a $C_2$ stream;

said $C_2$ stream is fed to said olefin reaction zone;

the effluent from said first olefin reaction zone less said $C_2$ stream and comprising $C_4$ olefins is fed to a second olefin reaction zone and reacted therein to produce additional isoamylene;

the effluent from said second olefin reaction zone is separated to produce a stream comprising propylene, a stream comprising butenes, and a stream comprising $C_5$ and heavier olefins;

said stream comprising propylene is fed to said dimerization zone;

said stream comprising butenes is fed to said second olefin reaction zone;

said stream comprising $C_5$ and heavier olefins is further separated to produce a $C_6$ and heavier stream; and said $C_6$ and heavier stream is fed to said first olefin reaction zone.

7. The process of claim 1 wherein:

said branched acyclic dimer is fed into a first olefin reaction zone and reacted therein with ethylene according to the olefin reaction to produce isobutene and isoamylene;

the effluent from said first olefin reaction zone is separated to provide a $C_2$ stream, a $C_3$ stream, a $C_4$ stream and a $C_5$ and heavier stream;

said $C_2$ stream is fed to said first olefin reaction zone;

said $C_3$ stream is fed to said dimerization zone;

said $C_4$ stream is fed to a second olefin reaction zone and reacted therein according to the olefin reaction to produce additional isoamylene;

the effluent from said second olefin reaction zone and said $C_5$ and heavier stream is separated to provide and additional $C_2$ stream, a $C_3$–$C_4$ stream, a $C_5$ stream and a $C_6$ and heavier stream;

said additional $C_2$ stream and components of said $C_6$ and heavier stream are fed to said first olefin reaction zone; and said $C_3$–$C_4$ stream is fed to said second olefin reaction zone.

8. A process for converting propylene to produce isoamylene, comprising the steps of:

feeding said propylene into a dimerization zone and producing in said dimerization zone a branched acyclic dimer of said propylene;

feeding said branched acyclic dimer produced in said dimerization zone into an olefin reaction zone and reacting said dimer with ethylene in said olefin reaction zone according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms, of each of said new pairs being connected by an olefinic double bond, to produce isobutene and isoamylene;

separating the effluent from said olefin reaction zone to produce a first separated stream comprising ethylene and a second separated stream comprising said isobutene;

recycling said first separated stream to said olefin reaction zone together with at least one olefin having at least six carbon atoms per molecule produced in the process; and recycling said second separated stream to said olefin reaction zone and reacting said isobutene according to the olefin reaction to produce additional isoamylenes.

9. The process of claim 8 wherein the effluent from said dimerization zone is fed without separation into said olefin reaction zone.

10. The process of claim 8 wherein:
the effluent from said dimerization zone is fed without separation into said olefin reaction zone;
the separation of the effluent from said olefin reaction zone also provides a $C_3$ stream, a $C_5$ stream and a $C_6$ stream;
said $C_2$ stream, said isobutene stream and said $C_6$ stream are recycled to said olefin reaction zone; and
said $C_3$ stream is recycled to said dimerization zone.

References Cited
UNITED STATES PATENTS

| | | | |
|---|---|---|---|
| 2,102,073 | 12/1937 | Ipatieff et al. | 260—683.15 |
| 3,261,879 | 7/1966 | Banks | 260—683 |
| 3,457,320 | 7/1969 | Stapp et al. | 260—683 |

DELBERT E. GANTZ, Primary Examiner

C. E. SPRESSER, JR., Assistant Examiner

U.S. Cl. X.R.

260—683.15